United States Patent [19]

Nakamura et al.

[11] Patent Number: 5,725,922
[45] Date of Patent: Mar. 10, 1998

[54] SEMICONDUCTIVE SILICONE RUBBER COMPOSITIONS AND SEMICONDUCTIVE SILICONE RUBBER ROLLS

[75] Inventors: Tsutomu Nakamura; Satao Hirabayashi, both of Usui-gun; Hiroshi Kikuchi, Minato-ku; Hirokazu Ando, Minato-ku; Takao Mizutani, Minato-ku, all of Japan

[73] Assignees: Shin-Etsu Chemical Co., Ltd.; Oki Data Corporation, both of Tokyo, Japan

[21] Appl. No.: 678,955

[22] Filed: Jul. 12, 1996

[30] Foreign Application Priority Data

Jul. 14, 1995 [JP] Japan ................... 7-201595

[51] Int. Cl.$^6$ ............... B32B 15/06; B32B 25/20; C08L 83/00
[52] U.S. Cl. .................. 428/36.9; 252/510; 252/511; 428/36.92; 428/447; 428/450; 492/53; 492/56; 492/59; 524/432; 524/474; 524/492; 524/493; 524/495; 524/496; 524/506; 524/789; 524/848; 524/860; 524/861; 524/862
[58] Field of Search ............... 428/447, 450, 428/36.9, 36.92; 492/53, 56, 59; 524/432, 474, 492, 493, 495, 496, 506, 789, 848, 860, 861, 862; 252/510, 511

[56] References Cited

U.S. PATENT DOCUMENTS

| | | | |
|---|---|---|---|
| 4,891,400 | 1/1990 | Schwabe et al. | 524/745 |
| 5,458,937 | 10/1995 | Nakamura et al. | 428/36.91 |

*Primary Examiner*—D. S. Nakarani
*Attorney, Agent, or Firm*—Millen, White, Zelano, & Branigan, P.C.

[57] ABSTRACT

The invention provides a semiconductive silicone rubber composition comprising (A) an organopolysiloxane containing at least two aliphatic unsaturated groups, (B) reinforcing silica powder having a specific surface area of at least 50 m$^2$/g, (C) a conductive agent, (D) a hydrocarbon oil having a heat loss of up to 30% at 200° C./4 hours, and (E) a curing agent. Cured silicone rubber of the composition has a resistance of $1\times10^3$ to $1\times10^{12}$ Ω which remains stable for long-term use. The semiconductive silicone rubber composition is appropriate as a semiconductive roll stock for the manufacture of charging rolls, transfer rolls and developing rolls in business machines.

14 Claims, 1 Drawing Sheet

7mm

SEMICONDUCTIVE SILICONE RUBBER COMPOSITIONS AND SEMICONDUCTIVE SILICONE RUBBER ROLLS

BACKGROUND OF THE INVENTION

1. Field of the Invention

This invention relates to a semiconductive silicone composition which cures into a semiconductive silicone rubber having an electrical resistance of $1\times10^3$ to $1\times10^{12}$ $\Omega$ which remains stable even on long-term use under high voltage and thus useful as semiconductive rolls such as charging rolls, transfer rolls and developing rolls. It also relates to a semiconductive silicone rubber roll.

2. Prior Art

In the field of business machines, a variety of rubber materials including silicone rubbers, urethane elastomers, ethylene-propylene rubbers, and natural rubber are currently used to form rolls while composite materials of these rubbers are also available. The rubber materials are used in a variety of applications as electrically insulating materials and electroconductive materials for anti-static and electric conduction purposes. Nowadays, semiconductive materials having an intermediate resistance range of $1\times10^3$ to $1\times10^{12}$ $\Omega$ are increasingly used as roll materials for copying machines or the like. For semiconductive roll materials, the stability of resistance is very important in most service environments where it is desirable to control current flow by the resistance of the rubber material itself, for example, to impart an appropriate transfer ability. Also a high voltage of about 300 volts to 10 kilovolts is often applied across a semiconductive roll material in order to provide a proper electric charge to an organic photoconductor (OPC) drum or to efficiently transfer toner from the OPC to paper.

Under a service environment where such high voltage is applied, the voltage with standing properties of prior art semiconductive roll materials are not satisfactory. During long-term use, their resistance deviates from the desired range. This phenomenon becomes outstanding as the applied voltage becomes higher and as more current flow is conducted. An improvement in this respect is thus desired.

Japanese Patent Application Kokai (JP-A) No. 199057/1985 discloses a conductive room temperature curable composition wherein a volatile organic compound having a boiling point of 20° to 250° C. is added in order to reduce resistance, that is, to blend a larger amount of conductive metal powder. The volatile organic compound is volatilized off upon curing. Although this composition is successful in achieving a low resistance, the volatile organic compound is not effective for producing semiconductive rolls having stable resistance over long-term use. Also for the purpose of achieving a low resistance, Japanese Patent Publication (JP-B) No. 28009/1992 discloses a method for preparing conductive silicone rubber by adding a volatile organopolysiloxane and blending a large amount of a conductive filler. The volatile organopolysiloxane also fails to produce semiconductive rolls which can maintain semiconductivity over a long term.

SUMMARY OF THE INVENTION

Therefore, an object of the present invention is to provide a semiconductive silicone rubber composition which cures into a semiconductive silicone rubber having an electrical resistance of $1\times10^3$ to $1\times10^{12}$ $\Omega$ which is fully stable under high voltage applied thereto. Another object of the present invention is to provide a semiconductive silicone rubber roll.

We attempted to blend a hydrocarbon oil having a heat loss of up to 30% at 200° C./4 hours in a semiconductive silicone rubber composition comprising an organopolysiloxane of the average compositional formula (I) defined below, reinforcing silica powder having a specific surface area of at least 50 m²/g, a conductive agent, and a curing agent. When the composition is molded into a semiconductive roll, the hydrocarbon oil serves to protect the conductive agent in the silicone rubber composition and to form a very thin coating on the roll surface. Then the roll can have a resistance of $1\times10^3$ to $1\times10^{12}$ $\Omega$, which is stable during long-term use under high voltages, especially voltages of higher than 100 volts. The roll experiences a minimized change of resistance and thus withstands long-term use. Accordingly, the resultant semiconductive silicone rubber composition is appropriate as a semiconductive roll stock for the manufacture of charging rolls, transfer rolls and developing rolls in business machines. The present invention is predicated on this finding.

Accordingly, the present invention provides a semiconductive silicone rubber composition comprising (A) 100 parts by weight of an organopolysiloxane containing at least two aliphatic unsaturated groups in a molecule and represented by the following average compositional formula:

wherein $R^1$ which may be identical or different is a substituted or unsubstituted monovalent hydrocarbon group and letter n is a positive number of 1.98 to 2.02, (B) about 5 to 70 parts by weight of reinforcing silica powder having a specific surface area of at least 50 m²/g, (C) about 0.1 to 300 parts by weight of a Conductive agent, (D) about 0.1 to 20 parts by weight of a hydrocarbon oil having a heat loss of up to 30% at 200° C./4 hours, and (E) an amount to cure component (A) of a curing agent.

Also contemplated herein is a semiconductive silicone rubber roll comprising a mandrel of a conductive material and a cover of the above-defined semiconductive silicone rubber composition cured around the mandrel.

DETAILED DESCRIPTION OF THE PREFERRED EMBODIMENT

Figure 1:
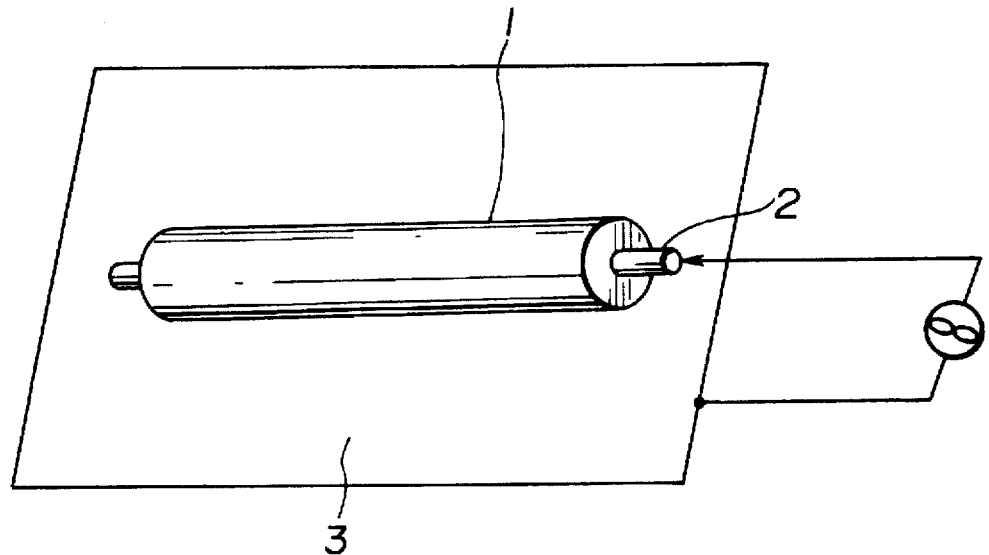
FIG. 1 schematically illustrates how to evaluate the stability of resistance under applied voltage of a semiconductive silicone rubber roll.

A first essential component (A) of the semiconductive silicone rubber composition according to the invention is an organopolysiloxane of the following average compositional formula (I):

wherein $R^1$ which may be identical or different is selected from substituted or unsubstituted monovalent hydrocarbon groups and letter n is a positive number of 1.98 to 2.02. More particularly, $R^1$ is independently selected from substituted or unsubstituted monovalent hydrocarbon groups having 1 to 10 carbon atoms, more preferably 1 to 8 carbon atoms, for example, alkyl groups such as methyl, ethyl, propyl and butyl groups; cycloalkyl groups such as cyclohexyl group;

alkenyl groups such as vinyl, allyl, butenyl and hexenyl groups; aryl groups such as phenyl and tolyl groups; and substituted ones of these groups wherein some or all of the hydrogen atoms attached to carbon atoms are replaced by halogen atoms, cyano groups or the like, such as halo-substituted alkyl groups, e.g., chloromethyl and trifluoropropyl and cyano-substituted alkyl groups, e.g., cyanoethyl. There should be contained at least two aliphatic unsaturated groups, preferably at least two alkenyl groups of 2 to 4 carbon atoms, typically vinyl groups as $R^1$. An aliphatic unsaturated group should preferably be contained in an amount of 0.001 to 20 mol %, especially 0.025 to 5 mol % of the entire $R^1$ groups.

The organopolysiloxane of formula (I) should preferably have a straight chain although a mixture of different molecular structures, for example, straight and branched chains is acceptable. It preferably has an average degree of polymerization of 100 to 10,000, especially 3,000 to 8,000.

A second essential component (B) is reinforcing silica powder which is essential for providing silicone rubber with mechanical strength. It should have a specific surface area of at least 50 $m^2/g$, preferably 100 to 300 $m^2/g$ as measured by a BET method. Silica powder with a specific surface area of less than 50 $m^2/g$ fails to provide cured rubber with mechanical strength. Examples include fumed silica and precipitated silica, which may be used alone or in admixture of two or more. The silica fillers may have been treated with suitable agents such as chlorosilanes and silazanes for imparting a hydrophobic surface.

About 5 to 70 parts by weight, preferably about 10 to 50 parts by weight of silica powder (B) is blended per 100 parts by weight of organopolysiloxane (A). Less than 5 parts of silica powder is less reinforcing whereas more than 70 parts of silica powder detracts from workability and mechanical strength.

A third essential component (C) is a conductive agent which is not critical insofar as it can impart conductivity to silicone rubber. Examples include carbon such as acetylene black, Ketjen Black, channel black, and graphite; conductive metal fines such as silver, nickel, stainless steel, and mixtures thereof, and silver-coated glass beads; and conductive metal oxides such as conductive zinc white and conductive titanium oxide. In the practice of the invention, carbon is most often used among these conductive agents since carbon offers a good balance of physical properties, workability, and cost. The carbon used herein should be free of a substance which is detrimental to crosslinking reaction of silicone rubber. Also, blending conductive zinc white as the conductive agent is preferred for resistance stabilization. The conductive zinc white may be blended alone or in admixture with another conductive agent such as carbon. Combined use of carbon and conductive zinc white is recommended.

The conductive agent is added in such amounts that the composition may have a resistance in the semiconductive range where stabilization of resistance is generally difficult, that is, a resistance of $1\times10^3$ to $1\times10^{12}$ $\Omega$, more preferably $1\times10^5$ to $1\times10^{10}$ $\Omega$. In general, about 0.1 to 300 parts, preferably 2 to 250 parts by weight of the conductive agent is blended per 100 parts by weight of the organopolysiloxane (A). Less than 0.1 parts of the conductive agent fails to provide the additive effect whereas compositions containing more than 300 parts of the conductive agent are too conductive. Where carbon is blended as the conductive agent, the preferred loading is 1 to 50 parts, especially 2 to 30 parts by weight per 100 parts by weight of the organopolysiloxane (A). Where a conductive metal fine or conductive metal oxide is blended as the conductive agent, the preferred loading is 20 to 300 parts, especially 50 to 250 parts by weight per 100 parts by weight of the organopolysiloxane (A).

A fourth essential component (D) is a hydrocarbon oil. Any of nonvolatile liquid and high-viscosity hydrocarbon oils having a carbon-to-carbon bond may be used insofar as their volatility is such that the heat loss (volatile matter) is up to 30%, preferably 0 to 20%, more preferably 0 to 10% when heated at 200° C. for 4 hours. Hydrocarbon oil containing more than 30% of volatile matter exacerbates the resistance characteristic of silicone rubber and can be oxidized or modified to invite a weight loss upon post curing, failing to achieve the advantage of a stabilized resistance in the semiconductive range. The volatility is measured by placing 1 ml of hydrocarbon oil in an aluminum dish having a diameter of 60 mm, heating the dish at 200° C. for 4 hours, and determining a weight change before and after heating. The hydrocarbon oil may have a linear, branched or cyclic structure insofar as the heat loss requirement is met. An unsaturated bond may be contained in a small amount enough to avoid any influence on heat resistance. Examples include paraffin oils, naphthenic oils, analogous oils containing an aromatic structure, and poly-alpha-olefin oils (PAO).

These hydrocarbon oils are generally obtained by chemical synthesis or refinement of naturally occurring mineral oils. It is understood that the hydrocarbon oil should desirably contain a lower proportion of components which inhibit curing of organopolysiloxane (A), such as sulfur and amine components. It is also acceptable to incorporate an antioxidant into the hydrocarbon oil insofar as the antioxidant does not inhibit curing of organopolysiloxane (A).

The hydrocarbon oil is blended in an amount of about 0.1 to 20 parts, preferably about 3 to 7 parts by weight per 100 parts by weight of organopolysiloxane (A). Less than 0.1 part of hydrocarbon oil is ineffective whereas more than 20 parts would substantially detract from the physical properties of silicone rubber.

A fifth essential component (E) of the silicone rubber composition is a curing agent which may be selected from combined organohydrogenpolysiloxane/platinum catalysts and organic peroxide catalysts which are well known as curing agents for silicone rubber.

The platinum group metal catalyst used herein may be selected from well-known platinum and similar catalysts. Exemplary platinum catalysts include elemental platinum, platinum compounds, platinum composites, chloroplatinic acid, and complexes of chloroplatinic acid with alcohols, aldehydes, ethers and olefins. The platinum catalyst is desirably added in an amount of 1 to 2,000 ppm of Pt based on the weight of organopolysiloxane (A).

The organohydrogenpolysiloxane is preferably of the following average compositional formula:

... (II)

wherein $R^2$, which may be the same or different, is a substituted or unsubstituted monovalent hydrocarbon group, letters a and b are numbers satisfying $0\leq a\leq 3$, $0.005\leq b\leq 2$, and $0.8<a+b<4$. The substituted or unsubstituted monovalent hydrocarbon groups represented by $R^2$ in formula (II) are as exemplified for $R^1$ in formula (I) although the $R^2$ group is preferably free of an aliphatic unsaturated bond.

The organohydrogenpolysiloxane used herein may be linear, cyclic or branched and preferably has an average degree of polymerization of up to 300.

Examples of the organohydrogenpolysiloxane of formula (II) are diorganopolysiloxanes end-blocked with a dimethylhydrogensilyl group, copolymers consisting of dimethylsiloxane units, methylhydrogensiloxane units and terminal trimethylsiloxy units, low viscosity fluids consisting of dimethylhydrogensiloxane $H(CH_3)_2SiO_{1/2}$ units and $SiO_2$ units, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane.

The organohydrogenpolysiloxane of formula (II) as the curing agent may be added in such amounts that 50 to 500 mol % of the hydrogen atom directly attached to a silicon atom is available based on the moles of the aliphatic unsaturated group (alkenyl group) in organopolysiloxane (A).

The organic peroxide catalysts include benzoyl peroxide, 2,4-dichlorobenzoyl peroxide, p-methylbenzoyl peroxide, 2,4-dicumyl peroxide, 2,5-dimethyl-bis(2,5-t-butylperoxy)hexane, di-t-butyl peroxide, and t-butyl perbenzoate. The organic peroxide catalyst may be added in an amount of about 0.1 to 5 parts by weight per 100 parts by weight of organopolysiloxane (A).

To the silicone rubber composition according to the invention, there may be added optional additives insofar as the object of the invention is not deterred. Useful additives are extending fillers such as silicone rubber powder, red iron oxide, ground quartz, and calcium carbonate. Blowing agents may be added if a sponge form is desirable. Exemplary blowing agents include azobisisobutyronitrile, dinitropentamethylenetetramine, and benzenesulfonhydrazide, and azodicarbonamide. The blowing agent may be used in an amount of about 1 to 10 parts by weight per 100 parts by weight of the entire silicone rubber composition.

If desired, various other additives such as coloring agents, heat resistance enhancers, reaction controlling agents, mold release agents and filler dispersing agents may be added to the composition of the invention. Exemplary filler dispersing agents are diphenylsilane diol, alkoxysilanes, carbon functional silanes, and silanol group-containing low molecular weight siloxanes while the amount thereof added should be minimal so as not to detract from the benefits of the invention.

Furthermore, any of well known flame retardants and fire resistant agents may be added to the silicone rubber composition of the invention for rendering it flame retardant and fire resistant. Examples include platinum-containing materials such as a platinum compound and titanium dioxide, platinum and manganese carbonate, and platinum and gamma-$Fe_2O_3$ as well as ferrite, mica, glass fibers, and glass flakes.

The silicone rubber composition of the invention is prepared by uniformly mixing the above-mentioned components in a rubber mastication machine such as a two-roll mill, Banbury mixer, and dough mixer or kneader, followed by optional heat treatment. The thus obtained silicone rubber roll material may be molded into a shape suitable for the intended application by any desired molding technique such as compression molding and extrusion molding. Curing conditions may be properly selected in accordance with a particular curing method and the gage of a molded part and usually include 100° to 400° C. and 5 seconds to 1 hour.

Where the composition as molded is subject to secondary vulcanization, it should preferably be vulcanized at 150° to 250° C. for 1 to 30 hours because high temperatures far exceeding the heat resistance of hydrocarbon oil (C) can significantly exacerbate the binding effect of the hydrocarbon oil.

A semiconductive silicone rubber roll is readily prepared by forming a cured layer of the semiconductive silicone rubber composition of the invention around a mandrel of a conductor material such as iron, aluminum, and stainless steel as by compression molding and extrusion molding. The silicone rubber is integrally bonded to the mandrel either by curing the silicone rubber composition to the mandrel or by preforming the silicone rubber composition into a tube, fitting the tube on the mandrel and treating them for integration. If desired, an adhesive or primer may be applied for improving the adhesion between the mandrel and the silicone rubber.

There has been described a semiconductive silicone rubber composition wherein the hydrocarbon oil protects the conductive agent in the silicone rubber and forms a very thin coating on the roll surface. From the semiconductive silicone rubber composition, there can be prepared a roll having a resistance in the range of $1\times10^3$ to $1\times10^{12}$ $\Omega$, which is stable during long-term use under high voltages, especially voltages equal to or higher than 100 volts. Since the roll experiences a minimized change of resistance and withstands long-term use, the semiconductive silicone rubber composition of the invention is appropriate as a semiconductive roll stock for the manufacture of charging rolls, transfer rolls and developing rolls in business machines.

EXAMPLE

Examples of the present invention are given below by way of illustration and not by way of limitation. All parts are by weight.

Example 1

A silicone rubber base compound was prepared by blending 100 parts of a rubbery organopolysiloxane consisting of 99.825 mol % of dimethylsiloxane units, 0.15 mol % of methylvinylsiloxane units, and 0.025 mol % of dimethylvinylsiloxane units and having an average degree of polymerization of about 5,000 with 3 parts of diphenylsilane diol as a dispersant, 4 parts of silanol group-terminated dimethylpolysiloxane having a degree of polymerization of 10, and 30 parts of treated silica having a specific surface area of 200 $m^2/g$ (Nihon Aerosil K.K.) and heat treating the blend for 2 hours.

To 100 parts of the base compound were added 8 parts of Denka acetylene black (Denki Kagaku Kogyo K.K.) and 5 parts of Sunpar 2280 (Nihon Sun Oil K.K.) which was a hydrocarbon oil having a heat loss of 4% at 200° C./4 hours (saturated component 76.5%, aromatic component 22.0%, and polar component 1.5%). The mixture was kneaded in a pressure kneader and passed through a 150-mesh screen, obtaining a conductive compound.

The conductive compound, 100 parts, was kneaded with 2 parts of 2,5-dimethyl-2,5-di(t-butylperoxy)hexane. The resulting compound was molded around a mandrel to form a silicone rubber roll having a diameter of 20 mm (rubber layer gage 5 mm). The molding was effected at a temperature of 165° C. and a pressure of 35 $kgf/cm^2$ for 10 minutes. The roll had a resistance of $1\times10^7$ $\Omega$.

Example 2

A silicone rubber roll was prepared as in Example 1 except that Lucant HC40 (Mitsui Petro-Chemical K.K.) which was a synthetic hydrocarbon oil having a heat loss of 10% at 200° C./4 hours was used instead of Sunpar 2280.

Example 3

A silicone rubber roll was prepared as in Example 1 except that poly-α-olefin (Mitsubishi Petro-Chemical K.K.)

which was a synthetic hydrocarbon oil having a heat loss of 5% at 200° C./4 hours was used instead of Sunpar 2280.

Example 4

A silicone rubber roll was prepared as in Example 1 except that a mixture of 100 parts of the base compound, 200 parts of conductive zinc white, 4 parts of Denka acetylene black, and 5 parts of Sunpar 2280 was kneaded in a pressure kneader.

meter 5 used was ultra-ohm meter R8340 manufactured by Advanced Digital K.K.

The results are shown in Table 1.

TABLE 1

|  | Example | | | | | Comparative Example | | | |
| --- | --- | --- | --- | --- | --- | --- | --- | --- | --- |
|  | 1 | 2 | 3 | 4 | 5 | 1 | 2 | 3 | 4 |
| Composition, pbw | | | | | | | | | |
| Base compound | 100 | 100 | 100 | 100 | 100 | 100 | 100 | 100 | 100 |
| Carbon | 8 | 8 | 8 | 4 | 8.5 | 8 | 8 | 8 | 8 |
| Hydrocarbon oil | 5 | 5 | 5 | 5 | 5 | — | 5 | 5 | 5 |
|  | Sunpar 2280 | Lucant HC40 | PAO | Sunpar 2280 | Sunpar 2280 | polyethylene glycol | ocatamethyl-cyclotetra siloxane | toluene | |
| Zinc white | — | — | — | 200 | — | — | — | — | — |
| Hydrocarbon oil's heat loss (%) | 4 | 10 | 5 | 4 | 4 | — | 40 | 100 | 100 |
| Vulcanization Resistance ($\Omega$) | peroxide | peroxide | peroxide | peroxide | platinum | peroxide | peroxide | peroxide | peroxide |
| Initial | $1 \times 10^7$ | $1 \times 10^7$ | $1 \times 10^7$ | $1 \times 10^7$ | $1 \times 10^7$ | $1 \times 10^7$ | $1 \times 10^7$ | $1 \times 10^7$ | $1 \times 10^7$ |
| After test | $1.6 \times 10^7$ | $2.8 \times 10^7$ | $1.9 \times 10^7$ | $1.3 \times 10^7$ | $1.7 \times 10^7$ | $1.5 \times 10^{13}$ | $5.0 \times 10^9$ | $1.2 \times 10^{12}$ | $2.0 \times 10^{12}$ |
| Change | 1.6 | 2.8 | 1.9 | 1.3 | 1.7 | 1500000 | 500 | 120000 | 200000 |

Note: Change = resistance after test divided by initial resistance

Example 5

A silicone rubber roll was prepared as in Example 1 except that a mixture of 100 parts of the base compound, 8.5 parts of Denka acetylene black, and 5 parts of Sunpar 2280 was kneaded in a pressure kneader, and silicon rubber was cured using 0.5 part of an alcohol solution of chloroplatinic acid (platinum concentration 1.0%) and 1.2 parts of methylhydrogenpolysiloxane having a SiH content of 0.005 mol % per 100 parts of the conductive compound as a curing agent instead of 2,5-dimethyl-2,5-di(t-butylperoxy)hexane.

Comparative Example 1

A silicone rubber roll was prepared as in Example 1 except that Sunpar 2280 was omitted.

Comparative Examples 2–4

Silicone rubber rolls were prepared as in Example 1 except that Sunpar 2280 was replaced by polyethylene glycol (volatile matter 40% at 200° C./4 hours), octamethylcyclotetrasiloxane, and toluene.

Figure 2:
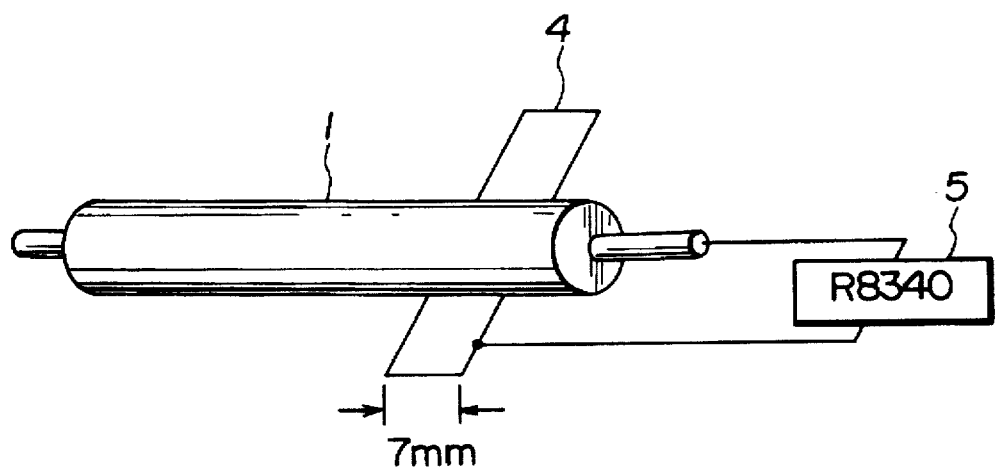
FIG. 2 schematically illustrates how to measure the resistance of a semiconductive silicone rubber roll.

The silicone rubber rolls were post-cured at 200° C. for 4 hours and measured for resistance. As shown in FIG. 1, a metal mandrel 2 was inserted into the semiconductive roll 1 and connected to one electrode of a power supply. The roll 1 was rested on a platinum electrode plate 3 which was connected to another electrode of the power supply. While the platinum electrode plate 3 was moved 10 mm back and forth, electricity was conducted at AC 50 Hz and 6 kV for 30 minutes between the mandrel and the platinum electrode. Thereafter, a change of the resistance of rubber material before and after the voltage application test was determined by measuring the resistance of rubber material as follows. The semiconductive roll 1 was placed in contact with an electrode 4 as shown in FIG. 2. The resistance was measured between the electrode 4 and the mandrel 2 using a meter 5. A voltage of 100 volts was applied for measurement and the As is evident from Table 1, semiconductive silicone rubber rolls of the present invention have excellent resistance stability to withstand applied voltage.

Japanese Patent Application No. 201595/1995 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A seminconductive silicone rubber composition comprising
    (A) 100 parts by weight of an organopolysiloxane containing at least two aliphatic unsaturated groups in a molecule and represented by the following average compositional formula:

$$R^1{}_n SiO_{(4-n)/2} \quad \ldots (I)$$

wherein $R^1$ which may be identical or different is a halogen- or cyano-substituted or unsubstituted monovalent hydrocarbon group and letter n is a positive number of 1.98 to 2.02,
    (B) about 5 to 70 parts by weight of reinforcing silica powder having a specific surface area of at least 50 $m^2/g$,
    (C) about 0.1 to 300 parts by weight of an electrically conductive agent,
    (D) about 0.1 to 20 parts by weight of a hydrocarbon oil having a heat loss of up to 30% at 200° C./4 hours, and
    (E) an amount to cure component (A) of a curing agent.

2. The composition of claim 1 wherein the electrically conductive (C) is carbon, conductive zinc white or a mixture thereof.

3. The composition of claim 1 having an electrical resistance of $1\times10^3$ to $1\times10^{12}$ Ω as cured.

4. A semiconductive silicone rubber roll comprising a mandrel of a conductive material and a cover of the semiconductive silicone rubber composition of claim 1 cured around the mandrel.

5. The composition of claim 1, wherein in formula (I) each $R^1$ is identical or different and is a monovalent hydrocarbon group having 1 to 10 carbon atoms optionally substituted by a halogen atom or cyano group.

6. The composition of claim 5, wherein in formula (I) each $R^1$ is identical or different and is an alkyl group, cycloalkyl group, alkenyl group, phenyl group or tolyl group optionally substituted by a halogen atom or cyano group.

7. The composition of claim 1, wherein the at least two aliphatic unsaturated groups are vinyl groups.

8. The composition of claim 1, wherein the amount of unsaturated groups in the organopolysiloxane of formula (I) is from 0.001 to 20.0 mol % of all $R^1$ groups.

9. The composition of claim 1, wherein the organopolysiloxane of formula (I) has an average degree of polymerization of 100 to 10,000.

10. The composition of claim 1, wherein the reinforcing silica powder, (B), has a specific surface area of from 100 to 300 $m^2/g$.

11. The composition of claim 1, wherein the reinforcing silica powder, (B), is treated with a chlorosilane or silazane to impart a hydrophobic surface thereto.

12. The composition of claim 1, having an electrical resistance of $1\times10^5$ to $1\times10^{10}$ Ω as cured.

13. The composition of claim 1, wherein the hydrocarbon oil, (D), is a paraffin oil, naphthenic oil or poly-alpha-olefin oil.

14. The composition of claim 1, wherein the curing agent, (E), is a combination organohydrogenpolysiloxane/platinum catalyst or an organic peroxide catalyst.

\* \* \* \* \*